US008956221B2

(12) United States Patent
Allen et al.

(10) Patent No.: US 8,956,221 B2
(45) **Date of Patent: *Feb. 17, 2015**

(54) AUTHORIZING AND MANAGING WAGERING AGENT ACCOUNTS

(71) Applicant: WMS Gaming, Inc., Waukegan, IL (US)

(72) Inventors: Jeffrey L. Allen, Naperville, IL (US); Peter R. Anderson, Glenview, IL (US); Christopher R. Barney, Las Vegas, NV (US); Larry J. Pacey, Northbrook, IL (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,097

(22) Filed: Nov. 18, 2013

(65) Prior Publication Data

US 2014/0080583 A1 Mar. 20, 2014

Related U.S. Application Data

(63) Continuation of application No. 12/937,592, filed as application No. PCT/US2008/064175 on May 19, 2008, now Pat. No. 8,622,815.

(60) Provisional application No. 61/045,122, filed on Apr. 15, 2008.

(51) Int. Cl.
*A63F 9/24* (2006.01)
*A63F 13/00* (2014.01)
(Continued)

(52) U.S. Cl.
CPC ............ *G07F 17/3244* (2013.01); *G07F 17/32* (2013.01); *G07F 17/3288* (2013.01)
USPC .................. 463/25; 463/16; 463/20; 463/40; 463/42

(58) Field of Classification Search
USPC .................................... 463/16, 20, 25, 40, 42
See application file for complete search history.

(56) References Cited

U.S. PATENT DOCUMENTS 7,156,741 B2 1/2007 Hornik et al.
2003/0216170 A1 11/2003 Walker et al.

(Continued)

FOREIGN PATENT DOCUMENTS

GB 2471433 12/2010
WO WO-2009128847 10/2009

OTHER PUBLICATIONS

"U.S. Appl. No. 14/222,995 Office Action", Jul. 7, 2014, 10 Pages.
Co-pending U.S. Appl. No. 14/222,995, filed Mar. 24, 2014, 38 pages.
"AU Application No. 2008354731 Examination Report", Apr. 3, 2013 , 3 pages.

(Continued)

*Primary Examiner* — Adetokunbo O Torimiro
(74) *Attorney, Agent, or Firm* — DeLizio Gilliam, PLLC

(57) ABSTRACT

Described herein are processes and devices that authorize and manage wagering agents and associated accounts. One of the devices described is a wagering game system. The wagering game system can detecting a request from a first player account to utilize a shared wagering fund to wager on a wagering game. The shared wagering fund can be funded by a second player account. The wagering game system can make the shared wagering fund available to the first player account to wager on a wagering game. The wagering game system can determine a game award produced by the wagering game. The system can then allocate a portion of the game award to the second player account.

20 Claims, 10 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |

(56) References Cited

U.S. PATENT DOCUMENTS

| | | | | |
|---|---|---|---|---|
| 2006/0046835 | A1 | 3/2006 | Walker et al. | |
| 2006/0246983 | A1 | 11/2006 | Huard et al. | |
| 2007/0087819 | A1 | 4/2007 | Luchene et al. | |
| 2007/0129141 | A1 | 6/2007 | Walker et al. | |
| 2008/0287182 | A1 | 11/2008 | Aida | |
| 2011/0086699 | A1 | 4/2011 | Allen et al. | |
| 2011/0269548 | A1* | 11/2011 | Barclay et al. .................. | 463/42 |
| 2014/0206438 | A1 | 7/2014 | Allen et al. | |

OTHER PUBLICATIONS

"PCT Application No. PCT/US2008/64175 International Preliminary Report on Patentability", Aug. 31, 2010 , 17 pages.
"PCT Application No. PCT/US2008/64175 International Search Report", Oct. 2, 2008 , 8 pages.
"UK Application No. 1018115.4 Examination Report", Oct. 26, 2012, 5 Pages.
"UK Application No. 1018115.4 Examination Report", Feb. 20, 2012, 6 pages.
"UK Application No. 1018115.4 Examination Report", Feb. 21, 2013, 8 pages.
"U.S. Appl. No. 12/937,592 Final Office Action", Aug. 31, 2012 , 23 pages.
"U.S. Appl. No. 12/937,592 Office Action", Mar. 21, 2012 , 24 pages.

* cited by examiner

AUTHORIZING AND MANAGING WAGERING AGENT ACCOUNTS

RELATED APPLICATIONS

This application is a continuation application that claims priority benefit of U.S. application Ser. No. 12/937,592 which is a National Stage Application of PCT/US2008/64175 filed 19 May 2008, which claims priority benefit of Provisional U.S. Application No. 61/045,122 filed 15 Apr. 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems, and more particularly to devices and processes that authorize and manage wagering agents and associated accounts of wagering game systems and networks.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Figure 1:
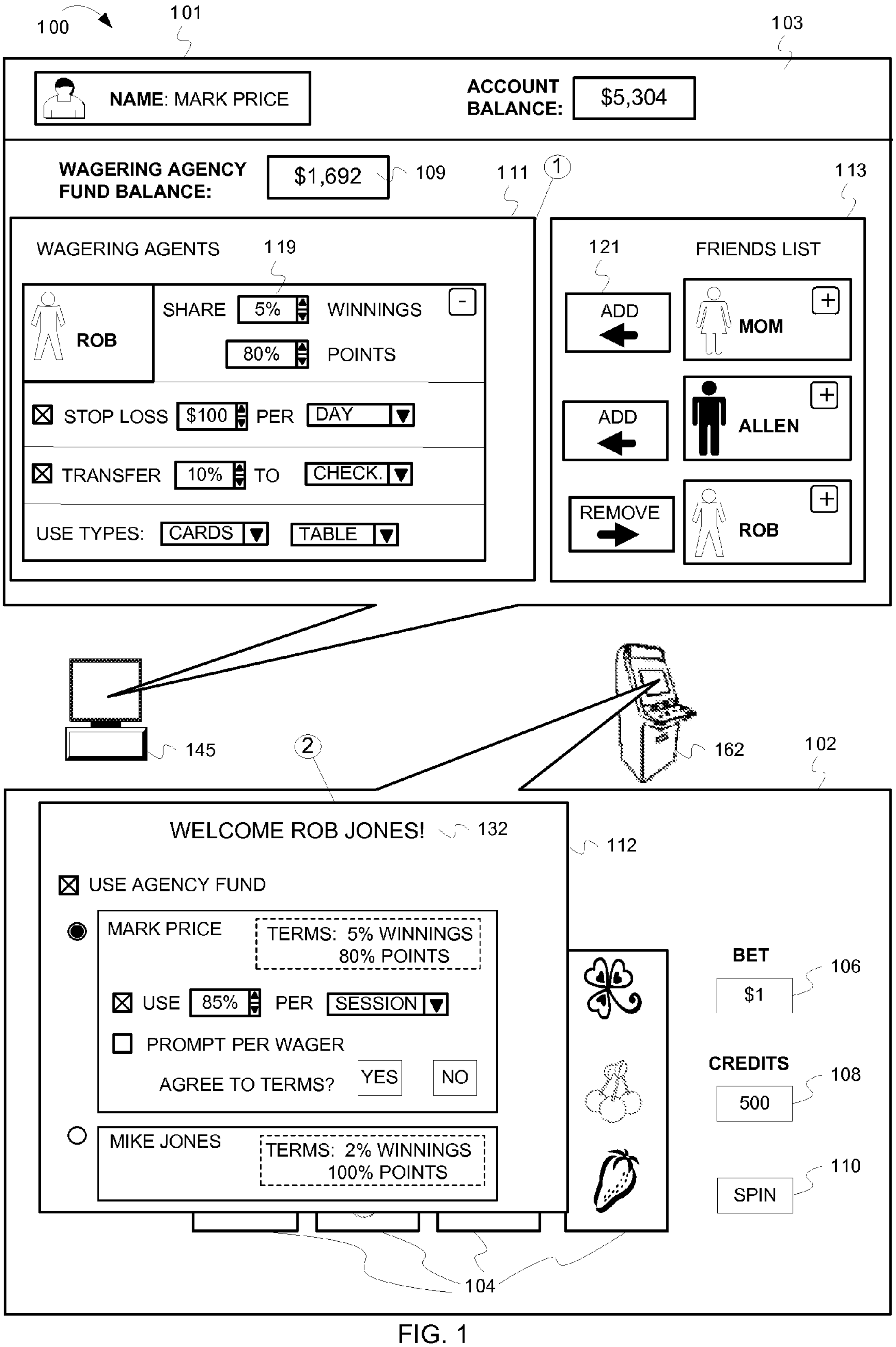
FIG. 1 is an illustration of authorizing wagering agents and utilizing shared wagering agency funds, according to some embodiments.

Many wagering game enthusiasts enjoy the thrill of winning wagering games. Most enjoy the fun and relaxation of simply playing a wagering game. However, many of those enthusiasts lack the time to play wagering games. Furthermore, according to many jurisdictional rules that regulate wagering games, many wagering game providers have to restrict the geographical location of wagering games to a casino facility. This geographic limitation on wagering games further limits the enthusiasts' ability to access wagering games with their limited time. FIG. 1 shows an embodiment of how to provide a wagering game enthusiast with the thrill of playing and winning wagering games, but without having to be in a casino.

FIG. 1 is a conceptual diagram that illustrates an example of authorizing wagering agents and utilizing shared wagering agency funds, according to some embodiments. In FIG. 1, a wagering game system ("system") 100 can include a computer 145 used to access a first wagering game account 103. The system 100 can provide wagering account settings 111 that the first player account 103 can use to designate another, or second player account 132, as a wagering "agent" account. The first player account 103 can also be referred to herein as an "authorizing" account 103, because it authorizes another account to wager on its behalf. The second player account 132 can be referred to as the wagering agent account 132.

The authorizing account 103 can allocate funds into a shared wagering agency fund 109 for the wagering agent account 132 to make wagers with. The authorizing account 103 can present a list of social contacts 113 (e.g., friends, family, etc.) that also have a wagering game account. The authorizing account 103 can include controls 121 to designate one or more of the social contact accounts as wagering agent account(s) (e.g., Mark Price, owner of the authorizing account 103 can use the controls 121 to designate Rob Jones, the owner of the wagering agent account 132, as a wagering agent). The authorizing account 103 can designate more than one wagering agency account, and thus allows for more than one wagering agent. The multiple wagering agent accounts can utilize the shared wagering agency fund 109. The wagering account settings 111 can store setting values 119 that can be used to control how the wagering agent account 132 can use the shared wagering agency fund 109. The setting values 119 can indicate terms of use, such as a shared percentage of winnings and/or points that the wagering agent account 132 can have. Other terms of use can include, but are not limited to, a loss or "stop" limit that caps the amount of losses that the wagering agent account 132 can incur, a maximum amount of a single bet that the wagering agent account 132 is permitted to make, a window of opportunity for the wagering agent account 132 to place a bet, and a type of wagering activity that the wagering agent account 132 can be limited to (e.g., card games, slot games, etc.)

A wagering agent player can log into a wagering game machine 162, using the wagering agent account 132, to play a wagering game. The wagering game can be displayed on a wagering game display 102. The wagering game machine 162 can present a prompt screen 112, to prompt the wagering agent player to utilize the shared wagering agency fund 109 associated with the authorizing account 103. The wagering game machine 162 can superimpose the prompt screen 112 above other display information, such as slot reels 104. The wagering game display 102 can also include meters (e.g., bet meter 106, credit meter 108, etc.) and controls (e.g., spin button 110), for controlling and tracking wagering game activities on the wagering game machine 162.

The terms of use can be displayed on the prompt screen 112. The wagering agent player can agree to the terms of use, and then utilize the wagering agency fund to make wagers on the game. According to the terms of use, the authorizing account 103 can share some, none, or all of the winnings and/or community account points ("points"). The system 100 can also provide a way for the wagering agent account 132 to utilize only a portion of the shared wagering agency fund 109 for bets, and still utilize a portion of the wagering agent account's own money. The system 100 can divide the winnings proportionate to the percentages of money used from the respective accounts. The system 100 can also provide a way for the wagering agent account 132 to use more than one wagering agency account. The system 100 can divide the game winnings amongst all authorizing accounts proportional to the amount of funds used from each of their respective wagering agency funds.

The computer 145 can be connected to a community server which can allow the authorizing account owner to access their account and see how their wagering agents are performing. The system 100 can even provide the ability to replay wagering game wins. Thus, the authorizing account owner can experience the thrill and excitement of wins without ever having to be in a casino.

Further, although the first player account 103 is described further above as an "authorizing" account, in some embodiments the first player account 103 can also be a wagering agent account.

According to some embodiments, the wagering game system 100 can include numerous capabilities and configurations. The following non-exhaustive list enumerates some example capabilities and configurations

- The system 100 can track multiple authorizing accounts adding to a single wagering agency fund. This configuration can build up the wagering agency fund to allow for larger bets.
- The system 100 can follow a lottery concept where if many authorizing accounts are contributing to a wagering agency fund, the system 100 can randomly select one authorizing account to receive a larger portion of the winnings
- The system 100 can require a player to register with a wagering agent account (e.g., at a kiosk, at a wagering game machine, etc.) before being able to access wagering agency funds.
- The system 100 can provide settings on the wagering agent account that indicates who the wagering agent will funds from (e.g., from friends, from people who play the same types of games, etc.) and/or in what order to take funds from authorizing accounts (e.g., the system 100 could cycle through a buddy list for taking wagering agency funds).
- The system 100 can also analyze behavior of wagering game agents and/or authorizing accounts and identify accounts, or automatically place bets, based on the analysis. For example, the system 100 can watch for "lucky" players who have had a streak of wins and then match the wagers of those "lucky" players.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
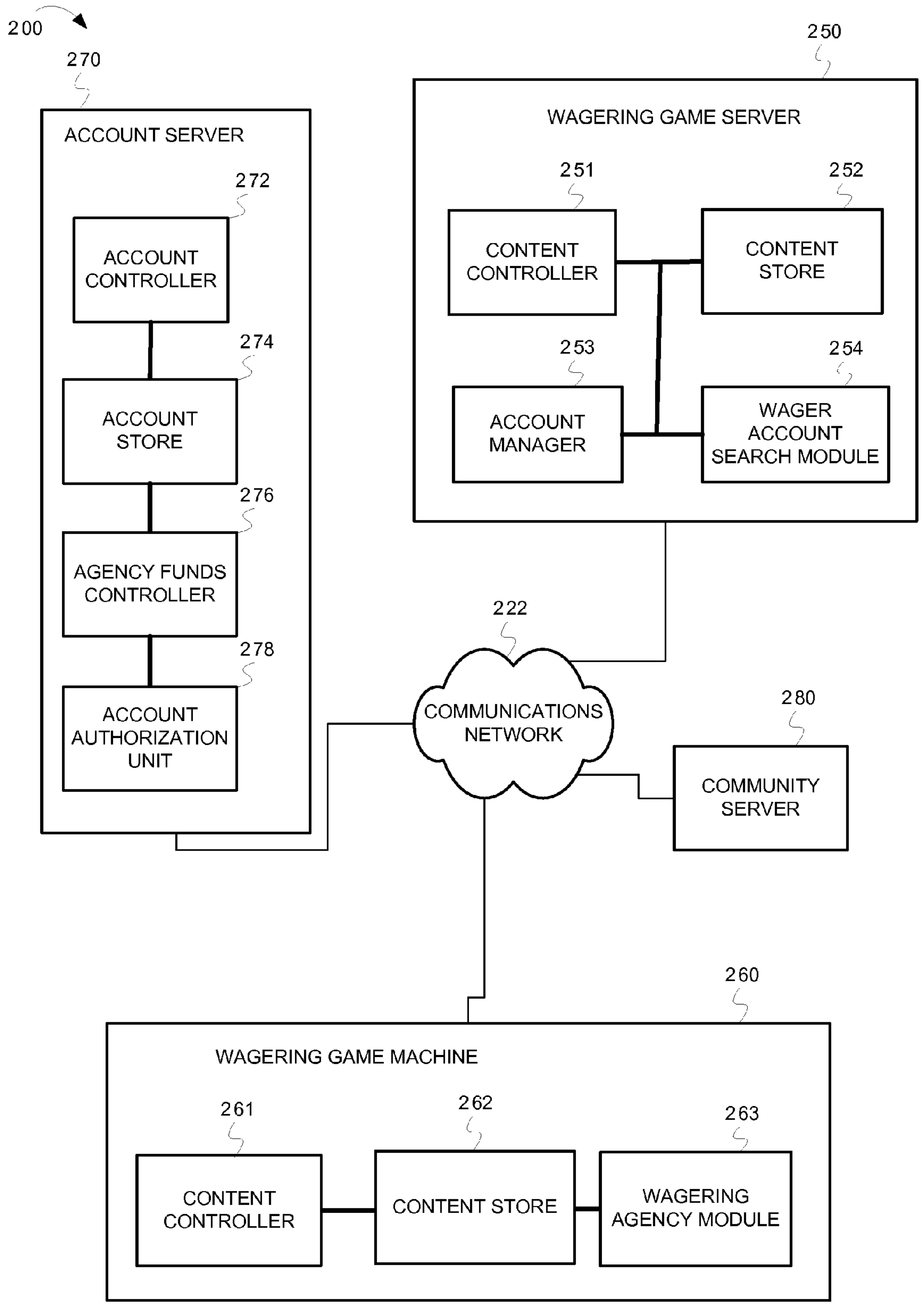
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers. The account server 270 can include an account controller 272 configured to control information for a player's account. The account server 270 also can include an account store 274 configured to store information for a player's account. The account store 274 can also store investment and/or lending criteria that can be compared to a player's history. The account server 270 also can include an agency funds controller 276 configured to control agency funds and transactions between authorized player accounts and wagering agent player accounts (e.g., shared agency funds, investment and/or lending funds, etc.) The account server 270 also can include an account authorization unit 278 configured to detect a request by a player to borrow or utilize funds, analyze a player account's game history, compare the game history to stored investment and/or lending criteria, and determine whether the player account is approved to borrow or use investment wagering funds.

The wagering game system architecture 200 also can include a wagering game server 250 configured to control wagering game content and communicate wagering game information, account information, and wagering agency information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 also can include a content store 252 configured to contain content to present on the wagering game machine 260. The wagering game server 250 also can include an account manager 253 configured to control information related to player accounts. For example, the account manager 253 can communicate wager amounts, game results amounts (e.g., win amounts), bonus game amounts, etc., to the account server 270. The account manager 253 can also allocates wins, wagers, points, etc. properly between authorizing accounts and wagering agent accounts. The wagering game server 250 also can include a wagering account search module 254 configured to search wagering accounts to find compatible matches for wager investment, lending, shadow bets, etc. The wagering account search module 254 can also communicate with the account server 270, using the account manager 253, to track wagering agency accounts.

The wagering game system architecture 200 also can include a wagering game machine 260 configured to present wagering games and receive and transmit information to authorize and manage wagering agents and associated accounts. The wagering game machine 260 can include a content controller 261 configured to manage and control content and presentation of content on the wagering game machine 260. The wagering game machine 260 also can include a content store 262 configured to contain content to present on the wagering game machine 260. The wagering game machine 260 also can include a wagering agency module 263 configured to process communications, commands, or other information, where the processing can authorize and manage wagering agents and associated accounts. The wagering agency module 263 can perform any function that any other system component can perform regarding, authorizing and managing wagering agents accounts and/or process data and control information provided by any of the other system components. The wagering agency module 263 can also track wagering activity between player accounts and wager agency funds. The wagering agency module 263 can also control wagering, game information related to wins and losses, and account balances for shared funds, investment funds, lending funds, etc. The wagering agency module 263 can also allocate wager amounts, wins, etc., to properly show account balances on a wager credit meter. The wagering agency module 263 can also track and utilize community wager credits left on the network. The wagering agency module 263 can also track players that match wagering criteria. The wagering agency module 263 can also place hidden bets on another player's wagering related activity.

The wagering game system architecture 200 can also include a community server 280. The community server 280 can store accounts related to social networks. Via the communications network 222, the community server 280 can access a casino account stored on the account server 270, and vice-versa. For example, the community account owner can login to the community server 280 and access the account server 270 to set user preferences. Further, the account server 270 can track the points that are earned during wagering games and then communicate those points to the community server 280 to be viewed and/or used with the community account.

Each component shown in the wagering game system architecture 200 is shown as a separate and distinct element. However, some functions performed by one component could be performed by other components. For example, the wagering game server 250 could track and process wagering agency funds. Furthermore, the components shown may all be contained in one device, but some, or all, may be included in, or performed by multiple devices on the systems and networks 222, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
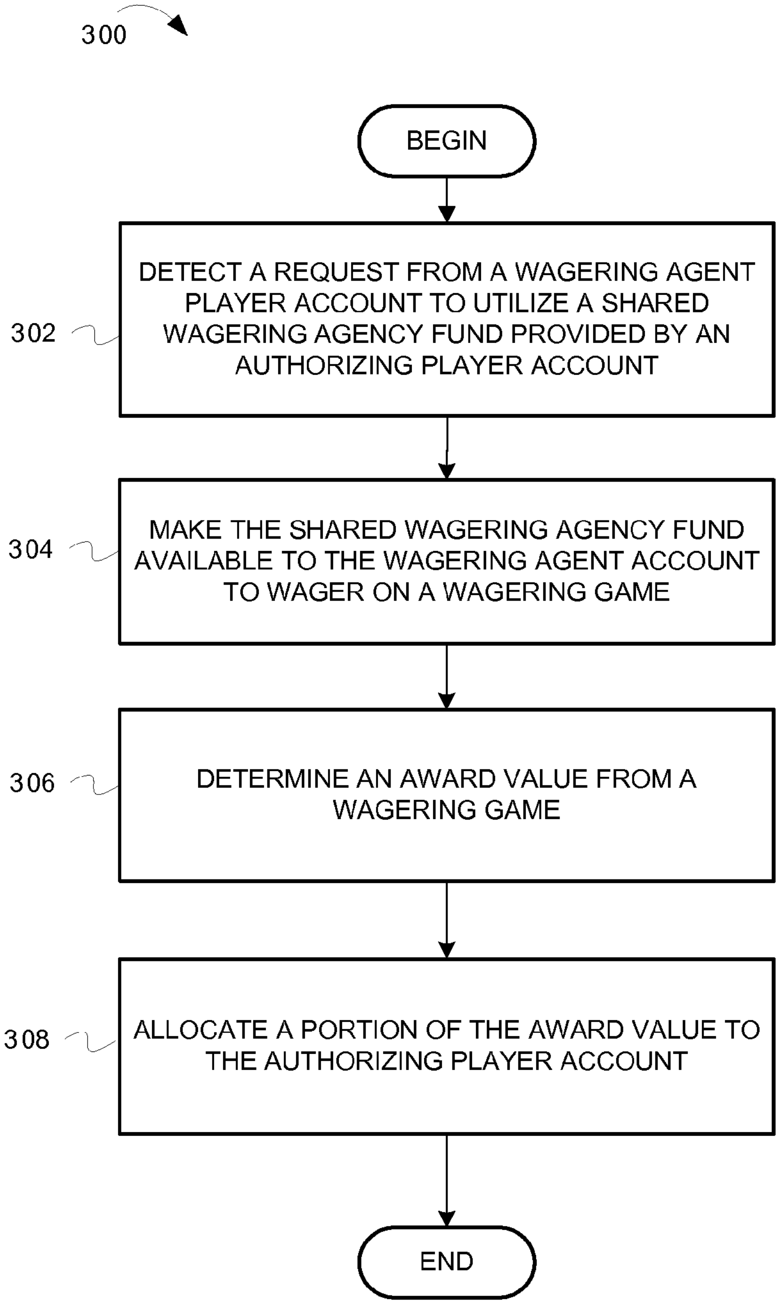
FIG. 3 is a flow diagram 300 illustrating processing wagering agency funds, according to some embodiments.

FIG. 3 is a flow diagram illustrating processing wagering agency funds, according to some embodiments. FIG. 1 is a conceptual diagram that helps illustrate the flow of FIG. 3, according to some embodiments. This description will present FIG. 3 in concert with FIG. 1. In FIG. 3, the flow 300 begins at processing block 302, where a wagering game system ("system") detects a request from a wagering agent player account to utilize a shared wagering agency fund provided by an authorizing player account. For example, as described previously in FIG. 1, the system 100 presents a prompt screen 112 and detects whether the wagering agent account 132 requests to utilize the shared wagering agency fund 109. In some embodiments, a system can utilize a default setting where a wagering agent account can default to utilize a shared wagering agency fund without being prompted.

The flow 300 continues at processing block 304, where the system makes the shared wagering agency fund available to the wagering agent account to wager on a wagering game. The system can make the shared wagering agency fund available per wager, or per an entire session. For example, in FIG. 1, the prompt screen 112 can include a setting that could prompt whether the wagering agent account 132 would like to bet using the shared wagering agency fund 109 per wager. The system 100, therefore, could make the shared wagering agency fund 109 available for any wager that utilizes the shared wagering agency fund 109, and can re-prompt the wagering agent player for each wager made during the session. On the other hand, the system 100 can utilize the shared wagering agency fund 109 per an entire game session, without re-prompting the wagering agent player to select the shared wagering agency fund 109. The system 100 can make the shared wagering agency fund 109 available to the wagering agent account 132 without providing access to any other portion of the authorizing account 103. The system 100 can make an accounting transaction that deducts a wager amount from an account server (e.g., account server 270 in FIG. 2) that hosts the authorizing account 103, causing the shared wagering agency fund 109 to reduce in value by the wager amount. The wagering game machine 162 can then display an updated bet credit meter 106 showing a wager amount using funds, or more specifically credit values, transacted from the shared wagering agency fund 109.

The flow 300 continues at processing block 306, where the system determines an award value from a wagering game. The system can determine a game result. For example a wagering game server (e.g., wagering game server 250 in FIG. 2) can have control logic that determines game results (e.g., wins, losses, bonuses, etc.). The wagering game server can determine a wagering game win amount, as well as any game points earned, bonus win amounts, etc. (referred to collectively as "award values".) based on game logic. The wagering game server can communicate the award values to the system components (e.g. to the wagering game machine, to an account server, etc.). For example, the wagering game server could communicate the award values to the wagering game machine to update credit meters, point meters, etc., showing an increase in meter value. The wagering game server can also communicate the award values to an account server to perform allocation processes of wins, game points, or other awards obtained from the game.

The flow 300 continues at processing block 308, where the system allocates a portion of the award value to the authorizing player account. The system can determine a percentage that the authorizing account earns, based on the pre-selected terms of use, for various award values. For example, the terms of use could indicate that the wagering agent account earns a specific percentage of the winnings (e.g., from 0% to 100%), of points, of bonus wins, etc. The system can calculate the percentages and allocate the award values between the authorizing account and the wagering agent account. For example, an account server can update an account balance on both the authorizing account and the wagering agent account based on the agreed terms of use. The system can also determine any other settings for controlling award values. For example, the authorized account may specify that a certain percentage of earnings from agency betting should go directly into a separate holding account, and not back into the shared wagering agency fund balance or the authorizing account balance.

Figure 4:
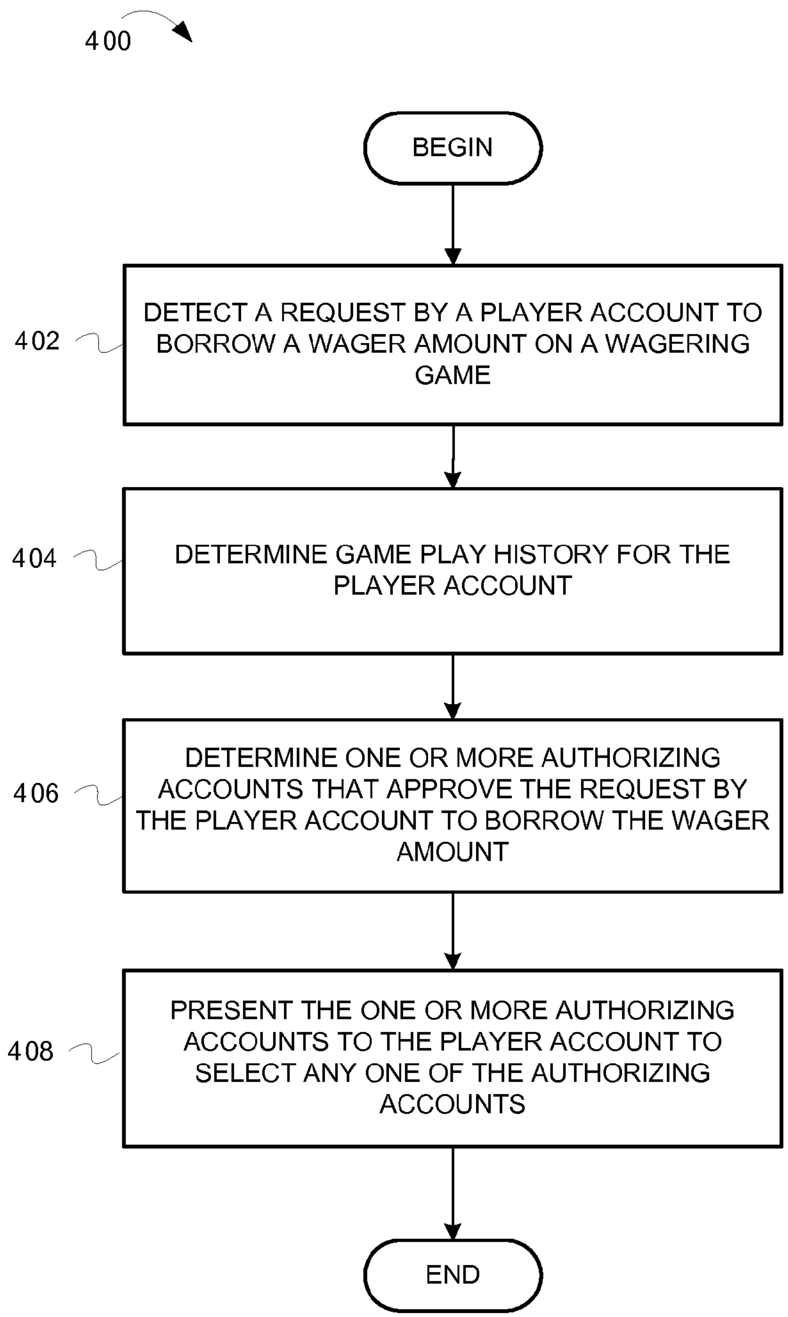
FIG. 4 is a flow diagram 400 illustrating authorizing a wagering agent account to borrow or use wagering agency funds, according to some embodiments.
Figure 5:
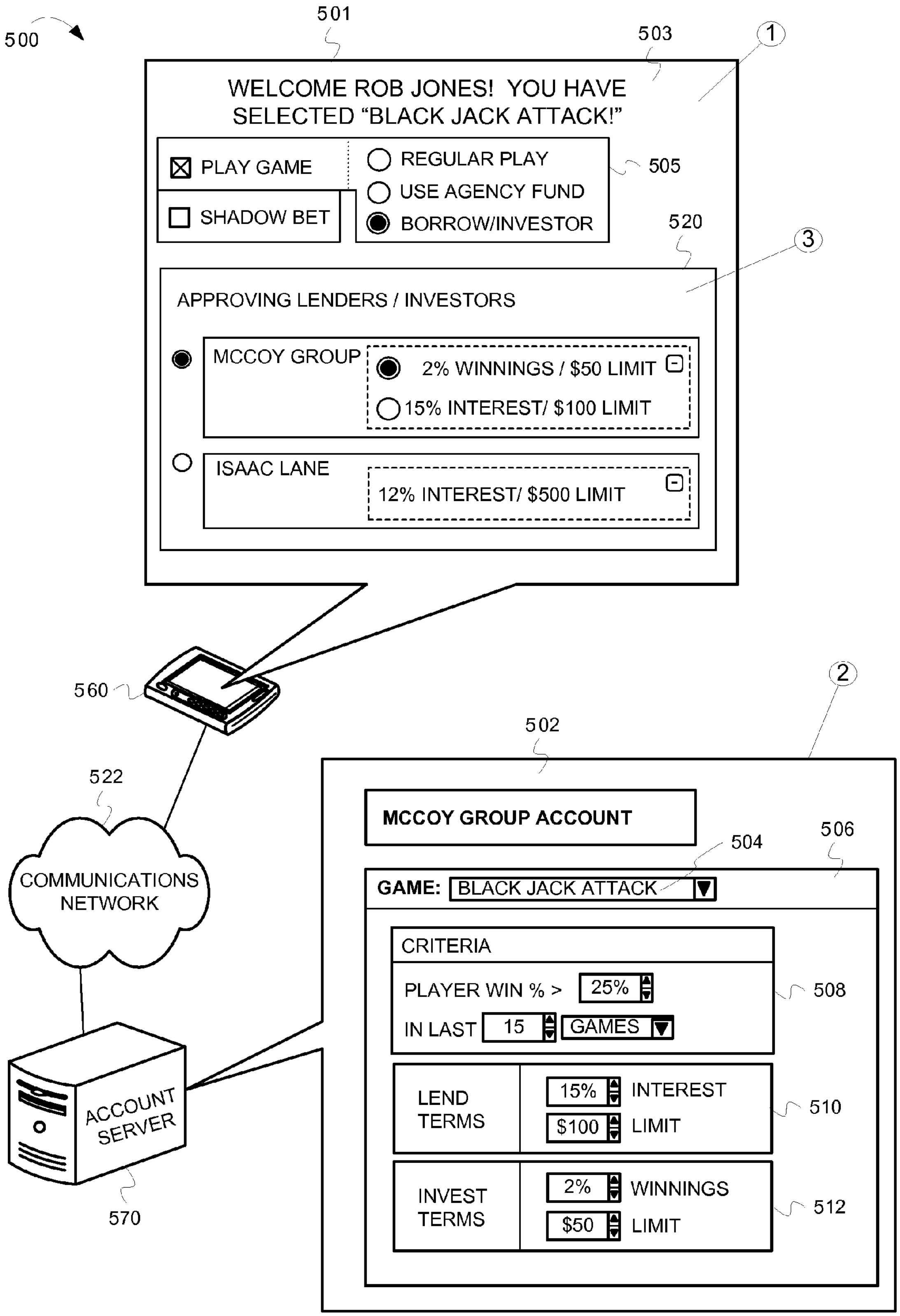
FIG. 5 is an illustration of authorizing a wagering agent account to borrow or use wagering agency funds, according to some embodiments.

FIG. 4 is a flow diagram illustrating authorizing a wagering agent account to borrow or use wagering agency funds, according to some embodiments. FIG. 5 is a conceptual diagram that helps illustrate the flow of FIG. 4, according to some embodiments. This description will present FIG. 4 in concert with FIG. 5. In FIG. 4, the flow 400 begins at processing block 402, where a wagering game system ("system") detects a request by a player account to borrow a wager amount on a wagering game. The system can provide a matchmaking service for players who are looking to gamble and people willing to invest in them. The system can provide account settings where a player can indicate what kinds of games they play, how they play them, what their past wagering history has been, etc. The system can also automatically analyze a player's history and determine statistical information about the types of games that a player plays, the winning results, etc. The system can provide account settings for the accounts that are willing to invest or lend funds to a player account. For brevity, wagering accounts that utilize funds from lenders ("lending funds") or that utilize funds from investors ("investment funds"), may be referred to herein collectively as "wagering agent accounts", similar to the wagering agent account 132 in FIG. 1. Each potential lender or investment account may be referred to herein specifically as a "lending" account or an "investment" account, depending on their specific roles or functions. The lending or investment accounts, however, can be referred to collectively as "authorizing" accounts, similar to the authorizing account 103 in FIG. 1. Each authorizing account can have settings that indicate how much money they are willing to stake, their limits on losses or wins, what they want played, how lucky/skilled they want their wagering agent account to be, etc. The system can detect when a wagering agent account wants to utilize authorized funds. For example, in FIG. 5, a wagering game system ("system") 500 includes a wagering game machine 560 connected to a communications network 522. An account server 570 is also connected to the communications network 522. A wagering game player can login to a wagering game account 503 using a wagering game machine 560. The wagering game account 503 can also be referred to as a "wagering agent account" 503 because the owner of the account can potentially be a wagering agent for one or more authorizing accounts. The wagering game machine 560 can display information from the wagering agent account 503 as well as game session information in a display 502. The wagering game machine 560 can display a prompt screen 505 that prompts the wagering game player to select to play a wagering game or shadow bet (shadow betting is described in more detail in conjunction with FIGS. 6 and 7). If a player selects to play a regular wagering game, then the prompt screen 505 can display additional settings that prompt the player to select from different wagering agency options. For example, the player can select to utilize a shared wagering agency fund (e.g., as described in FIG. 1), or a different type of agency account, such as a lending or investment account.

The flow 400 continues at processing block 404, where the system determines game play history for the player account. The system can determine game play history of the wagering agent account. The game play history can include any information that an authorizing account would find important in determining whether to lend or invest funds in the wagering agent account. For example, the system can provide settings that an authorizing account can use to set requirements for lending and/or investment. The requirements can relate to minimum game play history criteria for any potential wagering agents. The requirements can relate to game history information such as a win percentage over a specific period of time, a type of game played, a level of gambling stability versus compulsiveness, etc. FIG. 5 illustrates an authorizing account 502 with account settings 506 that indicate requirements for lending and/or investment criteria 508. For example, some criteria 508 for the requirements may include a player win percentage being higher than a set value, for a specific game 504, over a specific number of game plays. The account settings 506 can also provide settings for lending terms 510 and investing terms 512. For example, if a wagering agent account meets the criteria 508, then that player can choose to either borrow funds at the lending terms (e.g., borrow funds at 15% interest with a $100 borrowing limit) or to utilize investment funds at the investment terms (e.g., keep 2% of any winnings with a limit of $50 of usable funds).

Investment funds are similar to shared wagering agency funds (described in FIG. 1), but the wagering agent may not necessarily be a social contact of the owner of the investor account.

The flow 400 continues at processing block 406, where the system determines one or more authorizing accounts that approve the request by the player account to borrow the wager amount. The system can utilize the game play history for the wagering agent account and search for potential authorizing accounts. For example, in FIG. 5, the system 500 searches the account server 570 to find the authorizing account 502 (e.g., the "McCoy Group account"). The system 500 compares the game play history for the wagering agent account 503 to see if the game play history meets the minimum requirements indicated in the criteria 508. If the game play history comports with the criteria 508, then the system 500 can tag the authorizing account 502 as an "approving" lender and/or investor for the wagering agent account 503. In some embodiments, the system can automatically generate terms of use, such as interest rates. For example, the system can provide a range of requirements for game play history. If the wagering agent account's game play history meets criteria within the requirement range, then the system can automatically determine a risk score for providing funds to the wagering agent account. Based on the value of the risk score, the system can generate customized terms or use (e.g., custom interest rate, custom fund use limit, custom stop limits, etc.) for the wagering agent account.

The flow 400 continues at processing block 408, where the system presents the one or more authorizing accounts to the player account to select any one of the authorizing accounts. The system can present the authorizing accounts on a wagering game machine. For example, in FIG. 5, the system 500 presents the authorizing accounts in the approving accounts display 520. The approving accounts display 520 can include controls for selecting a specific account and for selecting whether to borrow funds according to lending terms of use or to utilize investment funds according to investment fund terms of use. In some embodiments, the system can present controls that allow the wagering agent account to select more than one authorizing account. The system can calculate a percentage of wagers, winnings, limits, etc., between the different authorizing accounts and proportionately allocate award values to the multiple authorizing accounts.

Figure 6:
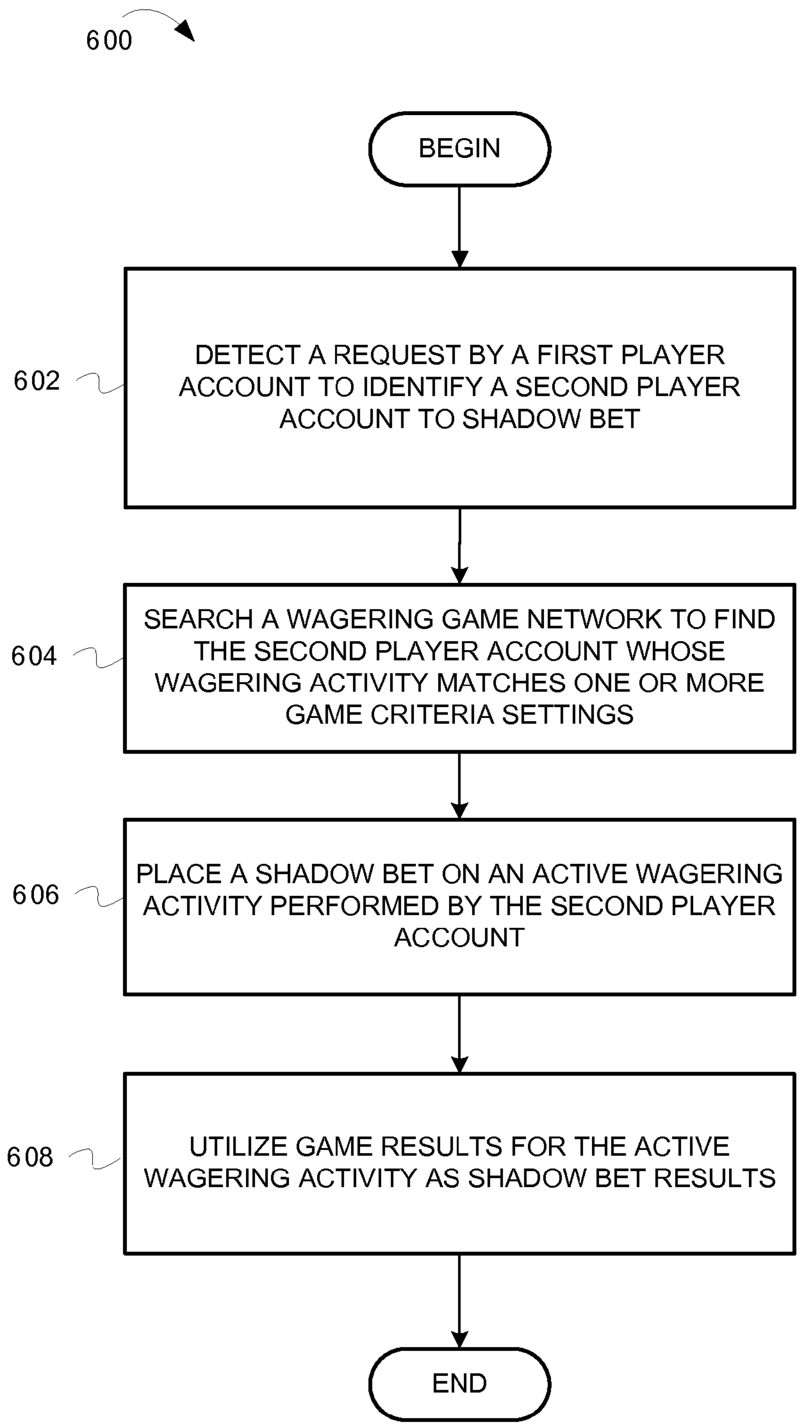
FIG. 6 is a flow diagram 600 illustrating shadow betting on wagering agent accounts, according to some embodiments.
Figure 7:
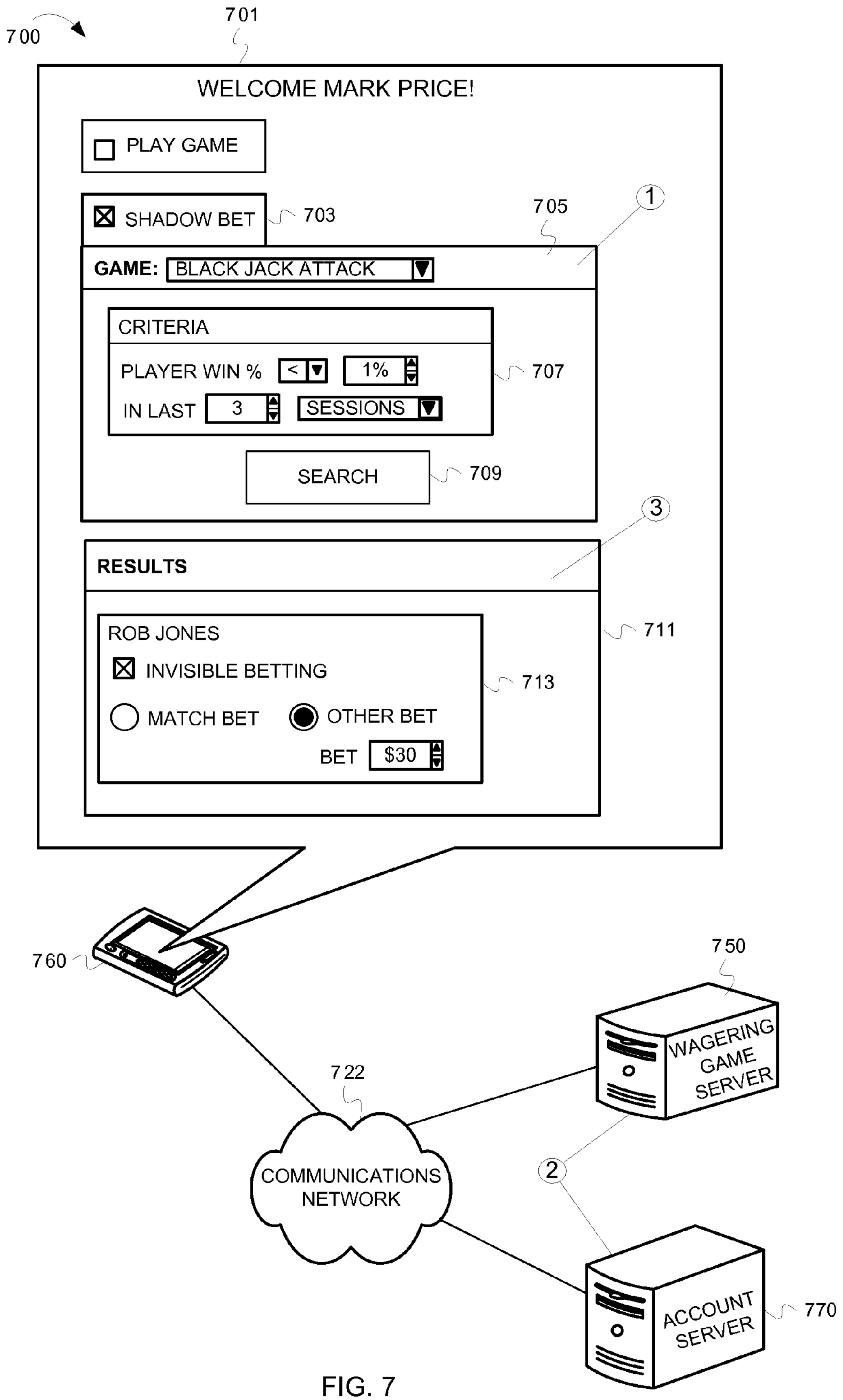
FIG. 7 is an illustration of shadow betting on wagering agent accounts, according to some embodiments.

FIG. 6 is a flow diagram illustrating shadow betting on wagering agent accounts, according to some embodiments. FIG. 7 is a conceptual diagram that helps illustrate the flow of FIG. 6, according to some embodiments. This description will present FIG. 6 in concert with FIG. 7. In FIG. 6, the flow 600 begins at processing block 602, where a wagering game system ("system") detects a request by a first player account to identify a second player account to shadow bet. In other words, the system can identify a first wagering game player, playing on a casino floor, so that a second player can wager on the first player's wagering game activities. The system can identify the first player based on specific rules, or criteria, that the second player has indicated using a player account. The second player can then place wagers in the background, based on the first player's playing activity, without the first player being aware of the background bets. In other words, the second player can "shadow" bet based on the first's players gambling efforts. Thus, the second player's account can be referred to specifically as a "shadow" betting account. The second player account can also be referred to as an "authorizing" account because the second player account is piggybacking off of the first player's game play efforts; or, in other words, the second player account is designating, or "authorizing" the first player account as a wagering agent to perform the game playing activity. Consequently, the first player account can be referred to as a "wagering agent account." In processing block 602, the system can detect when the authorizing account requests that the system identify the wagering agent account. For example, in FIG. 7, a system 700 includes a wagering game machine 760 connected to a communication network 722. A wagering game server 750 and an account server 770 are also connected to the communication network 722. A player can login to the wagering game machine 760 using an authorizing account. The system 700 presents a control 703 on a display 701 to initiate a request to search for wagering agents that meet certain criteria settings ("criteria") 707. The criteria 707 can relate to game play history (e.g., past win/loss patterns, types of players, types of games, times of day, etc.) that can be used to identify potential wagering agent accounts. In some embodiments, the criteria 707 can relate to game play history of certain machines, or general statistical patterns of various players, that can relate to one or more specific players playing games on the casino floor.

The flow 600 continues at processing block 604, where the system searches a wagering game network to find the second player account whose wagering activity matches the one or more game criteria settings. The system can utilize the criteria to search the wagering game network. For example, in FIG. 7, the system 700 can store the criteria 707 in the account server 770 and search the wagering game server 750 to find any wagering game accounts actively playing wagering games on the network. The system 700 can compare the criteria 707 to game play history (including the most recent wagering activity) of the active wagering game accounts. The system 700 finds any active wagering game accounts (i.e., wagering agent accounts) whose game play history matches the criteria settings. The system 700 then presents the wagering agent accounts to the authorizing account. The authorizing account can then select the wagering agent accounts to shadow bet.

The flow 600 continues at processing block 606, where the system places a shadow bet on an active wagering activity performed by the second player account. The system can shadow bet with a variety of options including emulating the wagering agent's betting (e.g., if the wagering agent account bets $5, the authorizing account bets $5), betting a different wager amount (e.g., the wagering agent account bets $5, but the authorizing account bets $1), betting on trends, betting on theoretical holds being exceeded or closed in on over a time period, etc. In FIG. 7, the system 700 can present bet settings 713 that the authorizing account can use to conduct the shadow betting options. The system can debit wager amounts from both the authorizing account and the wagering agent account before the game play begins. When the system finishes transacting the wager amounts placed by both accounts (or more if other shadow betters are also betting on the same wagering agent account), then the wagering agent can activate the game. For example, the system can prevent the activation of a control button that activates a game play (e.g., a "spin" button, a "deal" button, etc.) until all wagers have been transacted and updated on the account server.

The flow 600 continues at processing block 608, where the system utilizes game results for the active wagering activity as shadow bet results. The system can generate game results for the wagering agent's game. The game results will be a win, a loss, a draw, or some other result that applies to the specific game. Game logic in either the wagering game machine and/or the wagering game server controls the game results. The system can apply the game results to both the wagering agent's bet and to the shadow bet(s). For instance, if the wagering agent's game resulted in a win, then the authorizing account's bet could result in a win. In some embodiments, however, the system can provide contra-shadow-betting, or betting against the wagering agent's activities. In that case, the system can apply an opposing result to the contra-shadow-bets. The system can credit the respective accounts for wins or losses based on wager amounts. If the wager amounts were different (e.g., shadow bet was more or less than the wagering agent's bet), the system can calculate the appropriate win amounts and credit the accounts appropriately.

Figure 8:
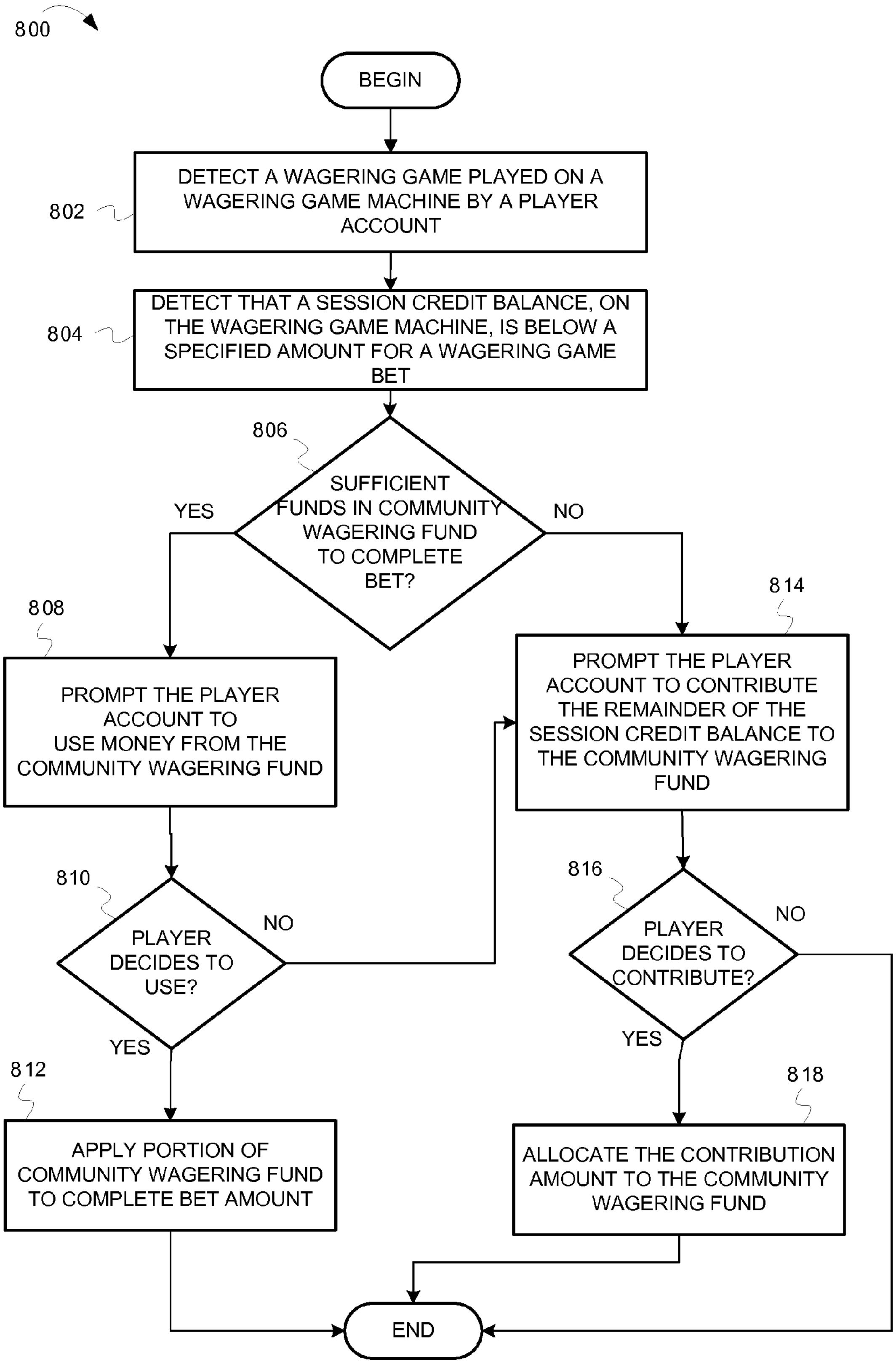
FIG. 8 is a flow diagram 800 illustrating utilizing a community wagering fund, according to some embodiments.

FIG. 8 is a flow diagram illustrating utilizing a community wagering fund, according to some embodiments. In FIG. 8, a flow 800 describes an embodiment where a player has some funds on a game session, but the funds are below a minimal playing amount. For example, the funds may be below the player's normal bet or below a minimum required bet. Consequently, the player has the option to transfer the remaining funds into a community wagering fund that anyone can draw from, or to pull from the community wagering fund to complete the bet. The community wagering fund is like a penny tray that a patron can give to if they have extra change, or draw from if short on a transaction amount. Flow 800 begins at block 802 where the system detects that a wagering game is being played on a wagering game machine. The player may have utilized most of the allocated player credits for the game session. At block 804, the system detects that a session credit balance, on the machine, is below a specific amount to complete a wagering game bet. Consequently, at block 806, the system can determine if a community wagering fund is available for the player to use, and if the community wagering fund has sufficient funds to complete the player's wager amount. The system can follow rules that may determine that the session credit balance meet a certain minimum percentage of the minimum bet. For instance, the system could have a limit set where the player's session credit balance should be at least 85% of the minimum required bet before the system will allow the player to utilize the money from the community wagering fund. If, at block 806, the system determines that there are sufficient funds in the community wagering fund to complete the player's wager amount, the system, at block 808, can prompt the player account if the player would like to take money from the community wagering fund. If the player decides to take from the community wagering fund, at block 810, the system permanently removes the money from the community wagering fund and applies it to the wager credit balance on the wagering game machine. The system can then initiate the wager and determine a game result. The system applies any winnings from the wager to the player's account.

If, however, at block 806, there are not sufficient funds in the community wagering fund (according to the system rules), or if the player, at block 810, decides not to use the community wagering fund, then, at block 814, the system can prompt the player account if the player would like to contribute the remainder of the session credit balance to the community wagering fund. If the player, at block 816, agrees to contribute, then, at block 818, the system can allocate the contribution amount from the player account to the community wagering fund, and player doesn't have an awkward, small number of wagering credits to cash out. The community wagering fund, in some embodiments, can be funded by a progressive, which on each wager, takes a small percentage of each bet and puts it in the community wagering fund for later use. In some embodiments, the community wagering fund can be machine specific, each machine having its own community wagering fund to draw from. On the other hand, in some embodiments, the community wagering fund can be accessible by any machine on a wagering game network.

Additional Example Embodiments

According to some embodiments, a wagering game system can provide various example devices, operations, etc., to authorize and manage wagering agents and associated accounts. The following non-exhaustive list enumerates some possible embodiments.

- A wagering game system ("system") can utilize an achievement system that tracks players' skills at certain games (e.g., video poker). The achievement system can also track betting habits of players, such as players who contribute large amounts of money, players that are conservative betters, etc.
- The system can charge a brokering fee, or transaction fee, for matching up authorizing accounts to wagering agent accounts.
- The system can set limitations regarding line bets and bonus bets
- The system can "watch" for players who are lucky, or who have had lucky streaks. Alternatively, the system can watch for players who have had unlucky streaks.
- The system can determine a percentage of how much money can be used from an agency fund based on the wagering agent's game play history.
- The system can report big wins via email, streaming media, etc. For instance, the system could provide a stock-ticker type of application for authorizing agents to keep track of wins by their wagering agents.
- The system can provide wagering options and rules for covering lines, covering progressives, box-top bonuses, etc.
- The system can leave money in play on a wagering agency fund until a certain event (e.g., until a wagering agent hits a royal flush).
- The system could monitor the wagering agent accounts and sweep in amounts won after a certain amount of time (e.g., every day, sweep in a certain amount into a savings account so that it is no longer in play).

Additional Example Operating Environments

This section describes example operating environments, systems and networks, and presents structural aspects of some embodiments.

Wagering Game Machine Architecture

Figure 9:
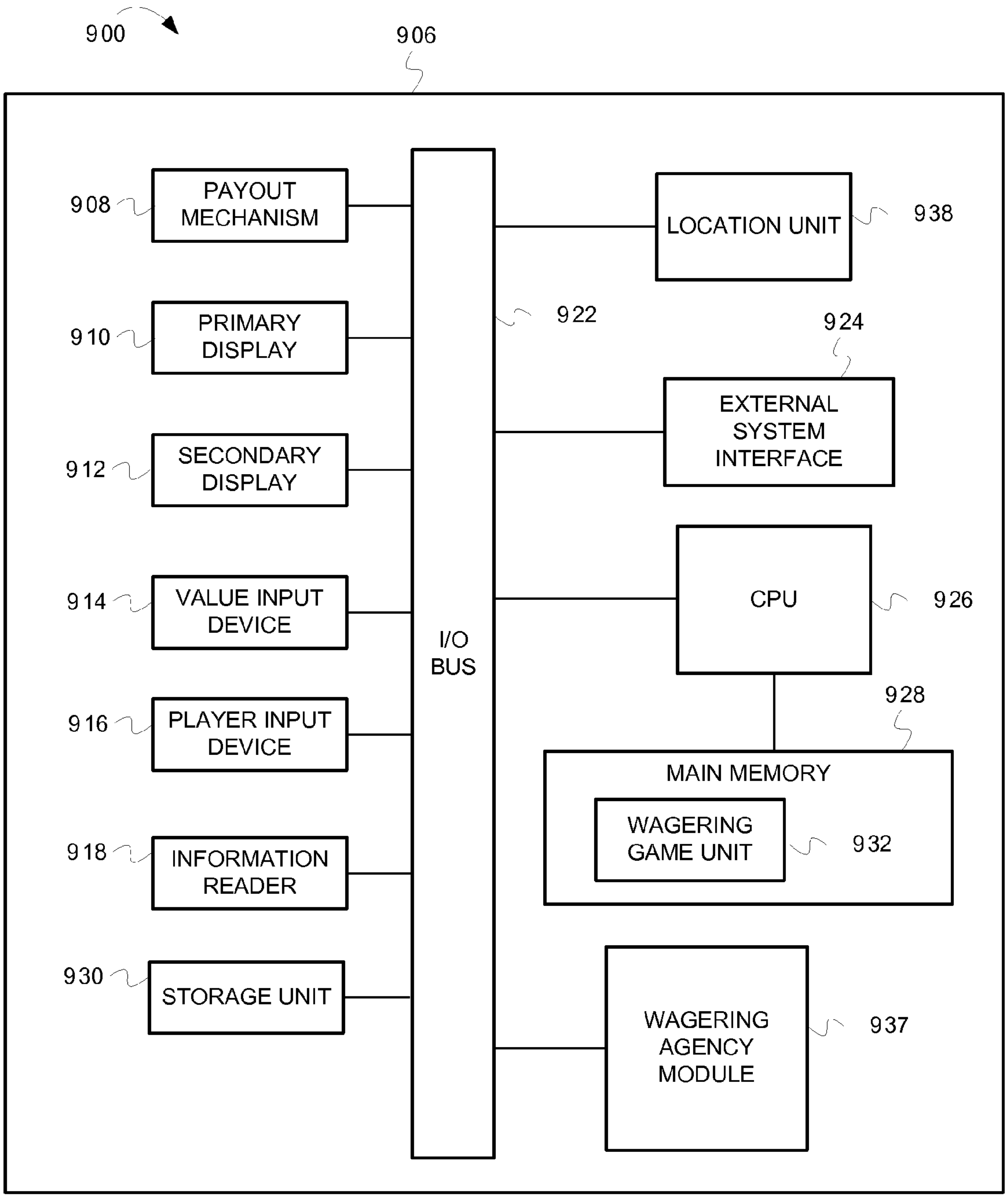
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In some embodiments, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a wagering agency module 937. The wagering agency module 937 can process communications, commands, or other information, where the processing can authorize and manage wagering agents and associated accounts.

Furthermore, any component of the wagering game machine 906 can include hardware, firmware, and/or machine-readable media including instructions for performing the operations described herein.

Mobile Wagering Game Machine

Figure 10:
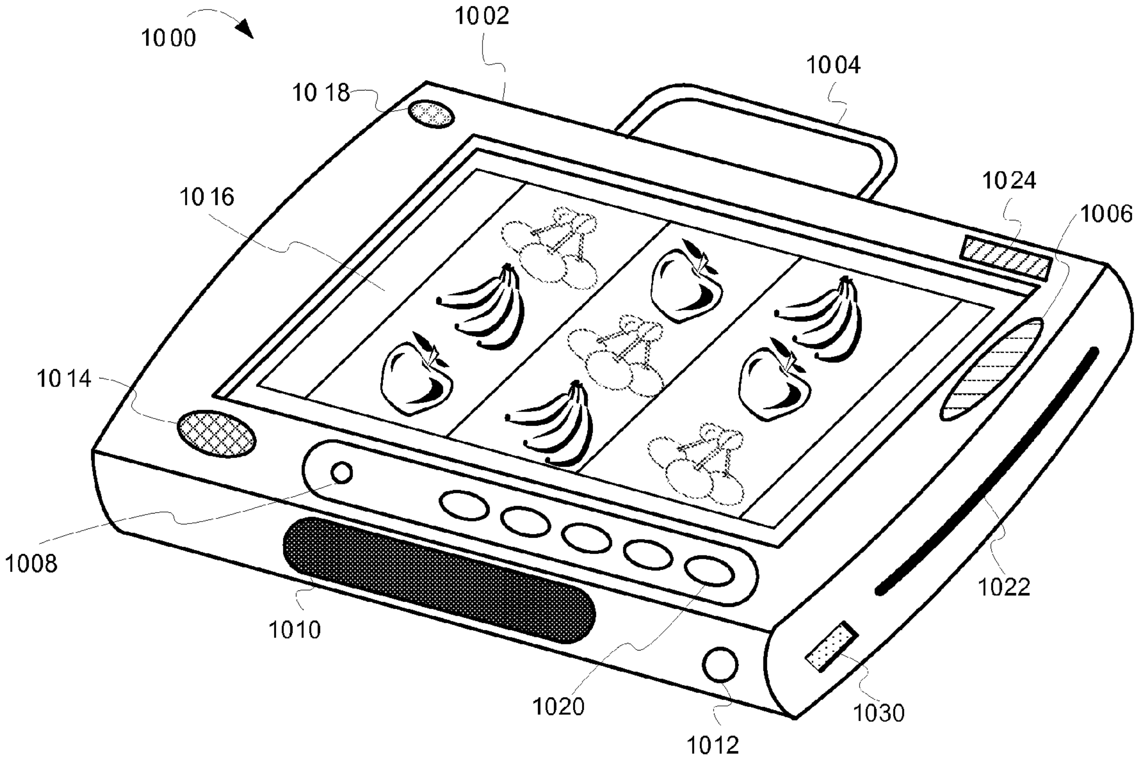
FIG. 10 is an illustration of a mobile wagering game machine 1000, according to some embodiments.

FIG. 10 is a conceptual diagram that illustrates an example of a mobile wagering game machine 1000, according to some embodiments. In FIG. 10, the mobile wagering game machine 1000 includes a housing 1002 for containing internal hardware and/or software such as that described above vis-à-vis FIG. 9. In some embodiments, the housing has a form factor similar to a tablet PC, while other embodiments have different form factors. For example, the mobile wagering game machine 1000 can exhibit smaller form factors, similar to those associated with personal digital assistants. In some embodiments, a handle 1004 is attached to the housing 1002. Additionally, the housing can store a foldout stand 1010, which can hold the mobile wagering game machine 1000 upright or semi-upright on a table or other flat surface.

The mobile wagering game machine 1000 includes several input/output devices. In particular, the mobile wagering game machine 1000 includes buttons 1020, audio jack 1008, speaker 1014, display 1016, biometric device 1006, wireless transmission devices 1012 and 1024, microphone 1018, and card reader 1022. Additionally, the mobile wagering game machine can include tilt, orientation, ambient light, or other environmental sensors.

In some embodiments, the mobile wagering game machine 1000 uses the biometric device 1006 for authenticating players, whereas it uses the display 1016 and speakers 1014 for presenting wagering game results and other information (e.g., credits, progressive jackpots, etc.). The mobile wagering game machine 1000 can also present audio through the audio jack 1008 or through a wireless link such as Bluetooth.

In some embodiments, the wireless communication unit 1012 can include infrared wireless communications technology for receiving wagering game content while docked in a wager gaming station. The wireless communication unit 1024 can include an 802.11G transceiver for connecting to and exchanging information with wireless access points. The wireless communication unit 1024 can include a Bluetooth transceiver for exchanging information with other Bluetooth enabled devices.

In some embodiments, the mobile wagering game machine 1000 is constructed from damage resistant materials, such as polymer plastics. Portions of the mobile wagering game machine 1000 can be constructed from non-porous plastics which exhibit antimicrobial qualities. Also, the mobile wagering game machine 1000 can be liquid resistant for easy cleaning and sanitization.

In some embodiments, the mobile wagering game machine 1000 can also include an input/output ("I/O") port 1030 for connecting directly to another device, such as to a peripheral device, a secondary mobile machine, etc. Furthermore, any component of the mobile wagering game machine 1000 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:

receiving, in an electronic wagering game system, a request from a first player account to place a shadow bet on a second player account's wagering game activity within the electronic wagering game system;

presenting, on a display device of a wagering game machine to the first player account, a list of one or more player accounts on whose wagering game activity the first player account can place a shadow bet, wherein the list of one or more player accounts includes player criteria for each of the one or more player accounts;

receiving, at the wagering game machine, player input from the first player account selecting the second player account from the list of one or more player accounts; and placing, within the electronic wagering game system, a shadow bet for the first player account on the second player account's wagering game activity.

2. The method of claim 1, wherein the player criteria includes one or more of past win patterns, past loss patterns, player account type, game type, machine type, time of day, past wins on a specific game, and past losses on a specific game.

3. The method of claim 1, further comprising:

determining play history preferences of the first player account, wherein the list of one or more player accounts on whose wagering game activity the first player account can place a shadow bet includes player accounts having player criteria that match the play history preferences of the first player account.

4. The method of claim 1, wherein the shadow bet one or more of is a bet for an amount that is the same as a bet placed by the second player account, is a bet that is for an amount that is different than a bet placed by the second player account, is a bet that is for a wagering game outcome that is the same as a bet placed by the second player account, and is a bet for a wagering game outcome that is different than a bet placed by the second player account.

5. The method of claim 1, further comprising:

notifying the second player account that the first player account is placing a shadow bet on the second player account's wagering game activity.

6. The method of claim 5, further comprising:

presenting a message to the second player account detailing the shadow bet.

7. The method of claim 1, further comprising:

determining that all shadow bets have been placed on the second player account's wagering game activity; and allowing the second player account to place a bet.

8. The method of claim 1, further comprising:

determining a result of the second player account's wagering game activity; and determining a reward for the shadow bet, based at least in part, on the result of the second player account's wagering game activity.

9. A method comprising:

receiving, in an electronic wagering game system, a request from a first player account to place a bet on another player account's wagering game activity within the electronic wagering game system;

determining, based on an account store of an account server of the electronic wagering game system, play history preferences for the first player account, wherein the play history preferences indicate preferred play history for other player accounts' wagering game activity within the electronic wagering game system;

determining, by an account authorization unit of the electronic wagering game system, other player accounts meeting the play history preferences for the first player account; and placing, by an agency funds controller of the electronic wagering game system, the bet on wagering game activity of one or more of the other player accounts on behalf of the first player account.

10. The method of claim 9, further comprising:

presenting, to the first player account, a list of the other player accounts having player criteria that meet the play history preferences for the first player account; and receiving, from the first player account, player input selecting one or more of the other player accounts from the list of the other player accounts.

11. The method of claim 9, wherein the player criteria includes one or more of past win patterns, past loss patterns, player type, game type, machine type, time of day, past wins on a specific game, and past losses on a specific game.

12. The method of claim 9, further comprising:

receiving, from the first player account, an indication to make the shadow bet invisible to the one or more of the other player accounts.

13. The method of claim 9, wherein the bet on another player account's wagering game activity one or more of is a bet for an amount that is the same as a bet placed by the second player account, is a bet that is for an amount that is different than a bet placed by the second player account, is a bet that is for a wagering game outcome that is the same as a bet placed by the second player account, and is a bet for a wagering game outcome that is different than a bet placed by the second player account.

14. A method comprising:

determining, based on an account store of an account server, that a first player account allows other player accounts to place bets on the first player account's wagering game activity;

determining, by the account server, player account history preferences for the first player account, wherein the player account history preferences indicate one or more of preferred play history and preferred wagering history for other player accounts;

determining, by the account server, other player accounts meeting the player account history preferences for the first player account; and allowing, by the account server, the other player accounts meeting the player account history preferences for the first player account to place bets on the first player account's wagering game activity.

15. The method of claim 14, wherein the player account history preferences include one or more of past win patterns, past loss patterns, past bets placed on another player account's wagering game activity, player type, game type, machine type, time of day, past wins on a specific game, and past losses on a specific game.

16. One or more non-transitory computer readable storage media, having instructions stored therein, which, when executed by one or more processors, causes the one or more processors to perform operations that comprise:

receiving a request from a first player account to place a shadow bet on a second player account's wagering game activity;

presenting, to the first player account, a list of one or more player accounts on whose wagering game activity the first player account can place a shadow bet, wherein the list of one or more player accounts includes player criteria for each of the one or more player accounts;

receiving player input from the first player account selecting the second player account from the list of one or more player accounts; and placing a shadow bet for the first player account on the second player account's wagering game activity.

17. The one or more non-transitory computer readable storage media of claim 16, wherein the player criteria includes one or more of past win patterns, past loss patterns, player account type, game type, machine type, time of day, past wins on a specific game, and past losses on a specific game.

18. The one or more non-transitory computer readable storage media of claim 16, the operations further comprising:

determining play history preferences of the first player account, wherein the list of one or more player accounts on whose wagering game activity the first player account can place a shadow bet includes player accounts having player criteria that match the play history preferences of the first player account.

19. The one or more non-transitory computer readable storage media of claim 16, the shadow bet one or more of is a bet for an amount that is the same as a bet placed by the second player account, is a bet that is for an amount that is different than a bet placed by the second player account, is a bet that is for a wagering game outcome that is the same as a bet placed by the second player account, and is a bet for a wagering game outcome that is different than a bet placed by the second player account.

20. The one or more non-transitory computer readable storage media of claim 16, the operations further comprising:

determining a result of the second player account's wagering game activity; and determining a reward for the shadow bet, based at least in part, on the result of the second player account's wagering game activity.

* * * * *